(12) United States Patent
Codignola

(10) Patent No.: US 7,341,666 B2
(45) Date of Patent: Mar. 11, 2008

(54) POLY-β-CARBOXYACRYLAMIDE POLYMER, USE THEREOF AND PROCESS FOR PREPARING THE SAME

(75) Inventor: Franco Codignola, Milan (IT)

(73) Assignee: Eurotecnica Contractors & Engineers S.p.A., Milan (IT)

( * ) Notice: Subject to any disclaimer, the term of this patent is extended or adjusted under 35 U.S.C. 154(b) by 282 days.

(21) Appl. No.: 10/508,918

(22) PCT Filed: Mar. 27, 2002

(86) PCT No.: PCT/IT02/00198

§ 371 (c)(1),
(2), (4) Date: May 12, 2005

(87) PCT Pub. No.: WO03/080686

PCT Pub. Date: Oct. 2, 2003

(65) Prior Publication Data

US 2005/0218079 A1    Oct. 6, 2005

(51) Int. Cl.
*C08F 22/38*    (2006.01)

(52) U.S. Cl. .................................................... 210/687

(58) Field of Classification Search ................. 210/687
See application file for complete search history.

(56) References Cited

FOREIGN PATENT DOCUMENTS

| EP | 0 108 909 | 5/1984 |
|---|---|---|
| EP | 0 802 177 | 10/1997 |
| WO | WO 00/71603 | 11/2000 |

*Primary Examiner*—Chester T. Barry
(74) *Attorney, Agent, or Firm*—Ohlandt, Greeley, Ruggiero & Perle, L.L.P.

(57) ABSTRACT

A poly-β-carboxyacrylamide polymer of formula (I) wherein X is an alkaline metal or a substituent capable of bringing about an exchange reaction with a salt of an alkaline earth metal, said polymer having a ponderal average molecular weight greater than or equal to 2,000. The use of said polymer and process for preparing the same

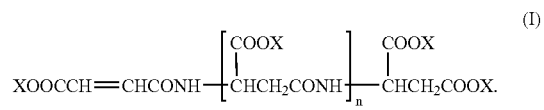

15 Claims, No Drawings

POLY-β-CARBOXYACRYLAMIDE POLYMER, USE THEREOF AND PROCESS FOR PREPARING THE SAME

The present invention relates to a poly-β-carboxyacrylamide polymer, the use thereof and a process for preparing the same.

In particular, the present invention relates to a poly-β-carboxyacrylamide polymer adapted to be used in the treatment of so-called "hard" water.

It is known that hard water is characterised by the presence of alkaline earth metals in the form of salts dissolved therein. Typical examples of said salts are the bicarbonate, chloride and sulphate of calcium and magnesium.

It is likewise known that the presence of such salts causes numerous problems either when they are found in the form dissolved in the water or when they precipitate in the form of salts insoluble in water.

In the first case, in particular, the presence of the aforesaid salts in dissolved form causes the precipitation of cationic type detergents in the form of calcium and magnesium salts, thereby hindering the formation of foam and thus leading to an increase in the consumption of the detergents themselves.

Moreover, the water which contains said dissolved salts is not very suitable for comestible use, in particular for cooking some foods such as, for example, pulses.

In the second case, said salts in precipitated form generally give rise to encrustation of taps, wash-basins and showers and, in view of the difficulty of removing them, they may also cause blocking of the flow regulating devices or of the drains.

In addition, such salts in the insoluble form are also deposited on heat exchange surfaces such as, for example, those of steam boilers, leading to a reduction in the amount of heat exchanged.

In recent years, therefore, numerous efforts have been made in the field of hard water treatment with the aim of finding compounds capable of reacting with the aforesaid salts.

Among the compounds tested, those belonging to the class of tripolyphosphates, phosphonates and polyacrylates showed a good sequestering capacity in relation to the aforesaid salts of alkaline earth metals.

However, once the sequestering activity was terminated, the tripolyphosphates and phosphonates proved to be difficult to remove from the water itself, with the consequent risk of pollution of the water-bearing strata and of the occurrence of the phenomenon of eutrophication.

The use of compounds belonging to the class of polyacrylates, on the other hand, has been hindered by the fact that such products have exhibited high levels of toxicity along with an absence of biodegradability, thus causing much damage to the environment.

It is likewise known that biodegradability is often closely linked to the molecular weight of the compound itself. In fact, in the majority of cases, when the number of monomeric units of a polymer exceeds a certain value, the biodegradability decreases to the point of disappearing.

For this reason, the search for a compound capable of reacting with the salts of alkaline earth metals-present in water has until now been directed towards compounds having a low molecular weight, thus leading, for example, to oligomers being preferred relative to polymers.

It has now surprisingly been found that a poly-β-carboxyacrylamide polymer of the formula (I)

has a sequestering activity in relation to the salts of alkaline earth metals and that even after having exerted its sequestering action, the product obtained turns out to be biodegradable.

A first object of the present invention is therefore a poly-β-carboxyacrylamide polymer of formula (I)

wherein

X is an alkaline metal or a substituent capable of bringing about an exchange reaction with a salt of an alkaline earth metal;

said polymer of formula (I) having a ponderal average molecular weight greater than or equal to 2,000.

Preferably, said polymer of formula (I) has a ponderal average molecular weight ranging between 5,000 and 50,000, and even more preferably a ponderal average molecular weight ranging between 10,000 and 30,000.

Preferably, in said compound of formula (I), X is Na.

Said compound of formula (I) is preferably prepared by means of polymerisation in the aqueous phase of a maleate of ammonium and of an alkaline metal or a precursor thereof in the presence of a chain terminating compound in the form of a maleate completely salified with an alkaline metal or with a substituent capable of bringing about an exchange reaction with a salt of an alkaline earth metal.

Preferably, the compound of formula (I) of the present invention is prepared by means of polymerisation in the aqueous phase of a maleate of sodium and ammonium in the presence of a chain terminating compound in the form of a maleate salified with an alkaline metal selected from lithium, sodium and potassium. Even more preferably, said chain terminating compound is in the form of a maleate salified with alkaline metals the same as each other selected from lithium, sodium and potassium.

In a preferred embodiment, in the process of the present invention, the monomer subjected to polymerisation is maleate of sodium and ammonium and the chain terminating compound is disodium maleate. Therefore, X in the final polymer is sodium.

The aforesaid monomer to be polymerised, that is to say, the maleate of sodium and ammonium, may be prepared starting from a precursor thereof such as maleic anhydride, to which ammonia, or a primary amine, and soda are added.

The aforesaid polymerisation in the aqueous phase is carried out at a temperature of between 90 and 175° C., preferably between 125 and 150° C. with a molar ratio between chain terminating compound and monomer to be polymerised equal to or greater than 1:8.

As a general guide, a person skilled in the art will appreciate that, if it is desired to obtain a compound of formula (I) having a ponderal average molecular weight greater than 2,000, the molar ratio between chain terminating compound and monomer to be polymerised will be regulated in such a manner that the monomer to be polymerised will have values greater than 8, while the chain terminating compound will be maintained at a value equal to 1.

For example, if it is desired to obtain a compound of formula (I) having a ponderal average molecular weight equal to 20,000, the molar ratio between chain terminating compound and monomer to be polymerised will be 1:100.

As stated previously, the compound of formula (I) of the present invention is adapted to be used as a sequestering agent in relation to alkaline earth metals in the form of salts.

Such use therefore constitutes a further aspect of the present invention.

Preferably, said compound of formula (I) is used as a sequestering agent for calcium and magnesium in the form of bicarbonate, chloride and sulphate.

Even more preferably, said compound of formula (I) is used as a sequestering agent for the calcium present in the water to be treated in the form of calcium bicarbonate.

The compound of formula (I) of the present invention may be used as it is or in the form of a composition in which the presence of a sequestering agent for alkaline earth metals is required such as, for example, a detergent composition, preferably of the ionic type, and even more preferably a detergent composition of the ionic type for washing machines.

In the latter case, in fact, the presence of the compound of formula (I) of the present invention makes it possible to substitute the ion exchange resins present in washing machines of conventional type.

In fact, it is capable of performing the same sequestering function in relation to alkaline earth metals as said resins, with the advantage, however, of not requiring of the user the repeated operations of regeneration of the resin itself.

Said detergent composition may also contain additives such as, for example, non-ionic surfactants, low molecular weight alcohols such as, for example, those having $C_1$-$C_4$ carbon atoms, glycols, ethers, buffers and zeolites.

Typical examples of suitable non-ionic surfactants are ethoxylated alcohols, ethoxylated alkylphenols, a sorbitan carboxylate of fatty acids, copolymers of silicone and mixtures thereof.

Detergent compositions comprising zeolites, generally in an amount of 20% (b.w.), are known as agents capable of partially blocking the ions of alkaline earth metals dispersed in solution.

For the purpose of increasing the blocking capacity of said zeolites, said detergent compositions also contain, generally in an amount of from 3 to 4% (b.w.), agents capable of sequestering said ions and of releasing them at the level of the zeolites. Such compounds take the name of "cobilder" and are, for example, EDTA and the polyacrylates.

However, the aforesaid "cobilders" are toxic and not biodegradable.

It has now surprisingly been found that the compound of formula (I) of the present invention is capable of acting as "cobilder".

A further aspect of the present invention is therefore the use of the compound of formula (I) as "cobilder".

Advantageously, the compound of formula (I) of the present invention, even after having exerted its sequestering action in relation to alkaline earth metals, in addition to being biodegradable, is also atoxic.

It can therefore be used in compositions adapted to remove alkaline earth metals present, for example, in the form of tartar, in the mouth. A typical example of said composition is a collutory (mouthwash).

Said collutory may also contain additives such as, for example, antibacterial agents.

A further aspect of the present invention is therefore a composition comprising an effective amount of the compound of formula (I).

Preferably, said composition is in the form of an aqueous solution.

This may be produced according to the conventional techniques of a person skilled in the art, such as, for example, mixing and dissolving.

The compound of formula (I) may also be used in a decalcifying device.

A further aspect of the present invention is therefore a decalcifying device comprising the compound of formula (I) of the present invention.

The following examples are valid for illustrating the present invention without, however, limiting it in any way.

EXAMPLE 1

Preparation of the Compound of Formula (I)

X=Na; MW=2,000

The chain terminator, that is to say, the disodium maleate, and the monomer to be polymerised, that is to say, the maleate of sodium and ammonium, were prepared together in the following manner: to maleic anhydride (1 mol) were added ammonia (1 mol) and, while stirring and slowly in order to avoid an excessive increase in temperature, caustic soda (1.125 mols). The amount of soda added is greater than that necessary to salify the free carbonyl of the ammonium maleate previously formed so as to obtain also the formation of the disodium salt.

The mixture of maleate of sodium and ammonium and disodium maleate thus obtained was heated to 120° C. while stirring for 3 hours until the polymerisation reaction was completed. After cooling, the product was used as it was or, before being used, was subjected to drying under vacuum.

EXAMPLE 2

Detergent Composition

| Components | % b.v. |
|---|---|
| Sorbitan carboxylate of oleic acid | 1.5 |
| Isopropyl alcohol | 4.4 |
| Compound of formula (I) of Example 1 | 1.5 |
| Water | q.b. |

EXAMPLE 3

Collutory

| Components | % (b.w.) |
|---|---|
| Benzalconium chloride | 0.03 |
| Compound of formula (I) of Example 1 | 2.00 |
| Water | q.b. |

Assay 1

Sequestering Activity

The compound of formula (I) (170 g) obtained according to the procedure indicated in the previous Example 1 was placed in a solution of calcium carbonate (in a concentration of 2% b.w; 10 ml).

The sequestering activity of the compound of formula (I) was evaluated by means of titration of the calcium ions in solution, using calcium acetate as titration agent for the calcium ions.

The clouding of the solution determined the final point at which the calcium acetate is no longer bonded by the compound of formula (I) and therefore the product of solubility of the calcium carbonate is reached and exceeded (0.0005 mol/litre).

The sequestering activity of the compound of formula (I) was equal to 405 mg/g and a clear final solution was obtained.

Assay 2

Biodegradability

The biodegradability of the compound of formula (I) was examined after the treatment described in Assay 1 by means of manometric respirometry, wherein a measured volume of an inoculated medium containing a known amount of substance to be tested is placed in a closed flask while stirring. The consumption of oxygen was determined from the reduction of volume of the air contained in the apparatus. The $CO_2$ developed was adsorbed on soda lime. The amount of oxygen taken from the substance (corrected for the blank) was expressed as a percentage of the chemical oxygen demand COD determined analytically. A reference substance was run in parallel to check the inoculum.

Experimental Conditions:

Weight of the tested compound of formula (I) Test 1: 106 mg;

Weight of the tested compound of formula (I) Test 2: 177 mg;

Reference (sodium benzoate): 37 mg;

Volume of medium: 500 ml;

COD of the tested compound of formula (I): 0.775 $mgO_2$/mg sample tested;

Concentration of COD in medium, Test 1: 164.3 $mgO_2$/l;

Concentration of COD in medium, Test 2: 276.3 $mgO_2$.l;

Concentration of the inoculum*: 29 mg/l SS (suspended solids):

Temperature: 22° C.±0.2.

* Activated drainage water was obtained from the aeration tank of the municipal water treatment plant of the city of Novara (Italy) on the day before the start of the assay. The drainage water was aerated at ambient temperature for 24 hours before use.

To carry out the assay, the compound of formula (I) of the present invention to be tested was weighed on a watch glass and added directly to the test flask.

The average percentage of biodegradability of the compound of formula (I) on the 34th day was equal to 94.13%. Said compound is therefore certainly held to be biodegradable.

Assay 3

Toxicity

The toxicity of the compound of formula (I) of the present invention obtained after the treatment of Assay 1 was evaluated by means of the "Microtox" method, which uses an instrument to detect toxic substances in bodies of water, aqueous solutions and solids suspended in water. Said method is based on the examination of the reduction in bioluminescence of *Vibrio fischeri*. The luminescence of the micro-organism used is in fact a physiological phenomenon being the result of a metabolic process and therefore an indication of the state of life of the cell. The presence of toxic substances in contact with a suspension of micro-organisms in fact inhibits the bioluminescence and said reduction is proportional to the concentration of such substances.

To carry out the present trial, stocks of lyophilised bacteria originating from genetically controlled clones were used. In this way, a higher statistical significance is guaranteed compared with other types of test.

The micro-organisms were suspended in a reconstitution solution and maintained at constant temperature for the entire duration of the assay. The tests were carried out in such a manner that in each sample of compound of formula (I) of the present invention $10^6$ bacteria were present.

The variation in luminescence was defined by comparing the sample (suitably diluted if necessary) with a control brought to a suitable osmotic pressure for the micro-organisms.

All the tests were conducted by evaluating the toxicity at 5, 15 and 30 minutes of contact between bacteria and the sample of compound of formula (I) of the present invention in an aqueous solution (10 g/l of compound of formula (I) of the present invention) corrected for pH with dilute NaOH to neutrality.

The aforesaid solution was subsequently diluted for carrying out the assay to the following concentrations: 8.19; 4.095; 2.048 and 1.024 g/l.

At the maximum concentration tested (i.e. 8.19 g/l) and for a contact time of 30 minutes, the maximum effect of inhibition of the luminosity was 12.9%.

Since said value is below 50%, which is, regarded as the threshold of toxicity for refluents, the compound of formula (I) is certainly held to be non-toxic.

The invention claimed is:

1. A poly-β-carboxyacrylamide polymer of formula (I)

wherein
X is an alkaline metal or a substituent capable of bringing about an exchange reaction with a salt of an alkaline earth metal,
said polymer having a ponderal average molecular weight greater than or equal to 2,000.

2. A polymer according to claim 1, wherein said polymer of formula (I) has a ponderal average molecular weight ranging between 5,000 and 50,000.

3. A polymer according to claim 1, wherein said polymer of formula (I) has a ponderal average molecular weight ranging between 10,000 and 30,000.

4. A polymer according to claim 1, wherein X is Na.

5. A process for preparing a polymer as described in claim 1, comprising the step of polymerisation in an aqueous phase of a maleate of ammonium and of an alkaline metal or a precursor thereof in the presence of a chain terminating compound in the form of a maleate completely salified with an alkaline metal or with a substituent capable of bringing about an exchange reaction with a salt of an alkaline earth metal, at a temperature of between 90 and 175° C. and a molar ratio between chain terminating compound and monomer to be polymerised equal to or greater than 1:8.

6. A process according to claim 5, wherein the compound of formula (I) is prepared by means of polymerisation in the aqueous phase of a maleate of sodium and ammonium in the presence of a chain terminating compound in the form of a maleate salified with an alkaline metal selected from lithium, sodium and potassium.

7. A process according to claim 6, wherein the monomer subjected to polymerisation is maleate of sodium and ammonium and the chain terminating compound is disodium maleate.

8. A process according to claim 5, wherein the reaction temperature is between 125 and 150° C.

9. A polymer obtainable according to the process described in claim 5.

10. The use of the polymer described in claim 1 as a sequestering agent in relation to the alkaline earth metals in the form of salts.

11. The use according to claim 10 as a sequestering agent for calcium and magnesium in the form of bicarbonate, chloride and sulphate.

12. The use according to claim 10 as a sequestering agent for calcium in the form of calcium bicarbonate.

13. A detergent composition comprising the polymer described in claim 1.

14. A collutory composition comprising the polymer described in claim 1.

15. A decalcifying device comprising the polymer described in claim 1.

* * * * *